(12) United States Patent
Jorgovanovic

(10) Patent No.: US 10,187,179 B1
(45) Date of Patent: Jan. 22, 2019

(54) SYSTEM FOR CONFIGURING A PACKET DETECTION THRESHOLD OF AN AUDIO DEVICE

(71) Applicant: AMAZON TECHNOLOGIES, INC., Seattle, WA (US)

(72) Inventor: Milos Jorgovanovic, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/470,594

(22) Filed: Mar. 27, 2017

(51) Int. Cl.
*H04B 17/00* (2015.01)
*H04L 1/00* (2006.01)

(52) U.S. Cl.
CPC .................................. *H04L 1/0026* (2013.01)

(58) Field of Classification Search
CPC ............ H04L 63/1425; H04L 63/1458; H04L 63/1416; H04L 2209/805; H04L 5/0037; H04L 67/02; H04L 9/0825; H04L 9/083; H04L 9/16; H04L 9/3247; H04L 41/16
USPC ...................................................... 455/67.13
See application file for complete search history.

(56) References Cited

U.S. PATENT DOCUMENTS

2008/0104270 A1* 5/2008 Lee .................... H04L 65/80
709/237
2013/0316727 A1* 11/2013 Edge .................. H04W 4/02
455/456.1

\* cited by examiner

*Primary Examiner* — Ajibola Akinyemi
(74) *Attorney, Agent, or Firm* — Lindauer Law, PLLC

(57) ABSTRACT

Described are techniques for modifying the detection threshold of a transmitting device based on sources of interference detected by a receiving device. The receiving device determines signal quality data associated with transmissions by the transmitting device and with interfering signals of other networks. The receiving device provides an indication of interfering networks for which the strength of the interference mitigates receipt of signals from the transmitting device. The transmitting device then determines signal quality data associated with transmissions of the interfering networks, as measured by the transmitting device, and sets a detection threshold to an amount less than or equal to the smallest signal quality value associated with an interfering network. In some cases, the detection threshold of the transmitting device is constrained by minimum and maximum threshold values, which may be modified based on a count of additional detectable networks or the frequency of use of the interfering networks.

20 Claims, 7 Drawing Sheets

SYSTEM FOR CONFIGURING A PACKET DETECTION THRESHOLD OF AN AUDIO DEVICE

BACKGROUND

When transmitting data from a first audio device to one or more other audio devices, the use of other networks may interfere with the ability of the other audio devices to receive or process the data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
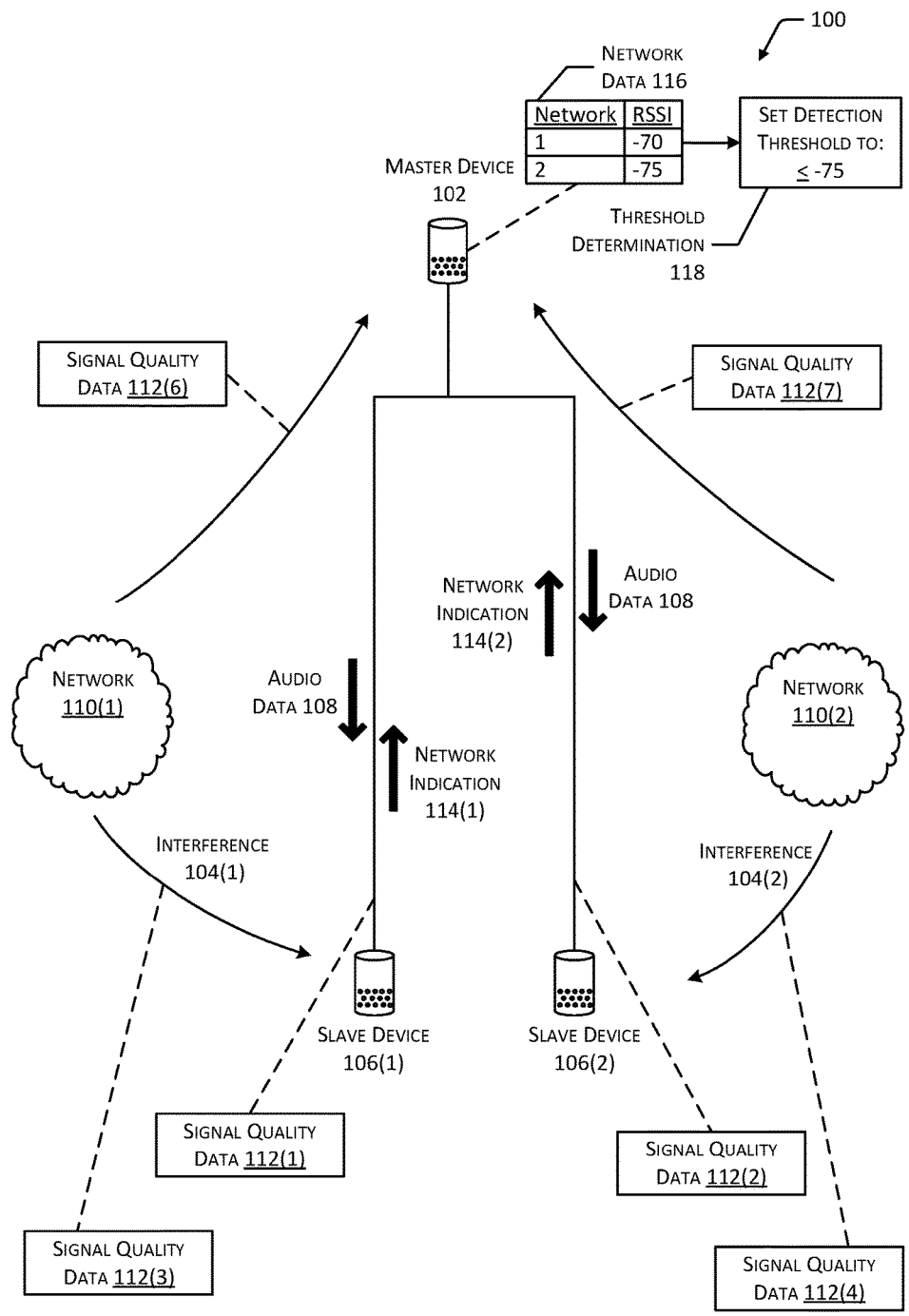
FIG. 1 depicts an implementation of a system for determining a detection threshold of a master device that may reduce the impact of interference on one or more slave devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, in communication with one another via one or more networks, to provide a synchronized audio output to users within an environment. In some cases, a user may select a particular group of audio devices to be used, such as a set of audio devices within a particular room of a home, or all of the audio devices located on a particular floor of the home. The user may also select a particular audio application to be used or particular audio content for output. Based on the location and other characteristics of each audio device, the timing, volume, and particular portions of the audio output for each audio device may be configured.

However, the quality of the audio output provided using a group of networked audio devices may be limited based on the characteristics of the audio devices, the network used by the audio devices, or other networks that may be detectable by one or more of audio devices. For example, a receiving audio device may be positioned a greater distance from a transmitting audio device than from a device associated with an interfering network. In such a case, signals associated with the interfering network may be detected by the receiving audio device with a greater signal strength than signals transmitted by the transmitting audio device. If one or more signals are being transmitted via the interfering network at the same time that the transmitting audio device is providing signals to the receiving audio device, interference from the interfering network may mitigate the ability of the receiving audio device to receive the signals from the transmitting audio device. As a result, multiple requests for retransmission by the receiving device and attempts to retransmit the data may be undertaken by the audio devices, and performance for the group of audio devices may be reduced. However, interfering networks that affect a receiving audio device may not be readily detectable by a transmitting audio device.

Described in this disclosure are techniques for determining one or more networks that may interfere with the ability of receiving audio devices to receive data, and configuring a transmitting audio device to detect the interfering networks and delay transmission of audio data until the activity of the interfering networks is below a level that may significantly impact receipt of the audio data. While implementations that include communications between audio devices are described herein, the techniques described in this disclosure may be used with any types of devices that transmit or receive any type of data. A group of audio devices may include multiple audio devices, access points, or other associated devices that communicate using one or more protocols, such as a Wi-Fi protocol that corresponds at least in part to section 802.11 of the specifications set forth by the Institute of Electrical and Electronics Engineers (IEEE). In other implementations, a group of devices may communicate using one or more other protocols, such as a Zig-Bee protocol that corresponds at least in part to section 802.15.4 of the IEEE specifications, a Long Term Evolution (LTE) standard, and so forth. Typically, the group of audio devices may include one or more master devices, each of which transmits audio data to one or more slave devices. Audio data may be transmitted from a first audio device to a second audio device via one or more access points. In other cases, audio data may be directly transmitted from a first audio device to a second audio device via a unicast transmission. Additionally, in some cases, audio data may be transmitted from a first audio device to multiple audio devices via a multicast transmission. Example implementations for forming a group of audio devices that transmit audio data using one or more access points are described in U.S. patent application Ser. No. 15/245,897, filed Aug. 24, 2016, entitled "System for Configuring Distributed Audio Output Using an Access Point", which is incorporated by reference herein in its entirety. Example implementations for forming a group of audio devices in which a master device communicates audio data to multiple slave devices via a multicast transmission are described in U.S. patent application Ser. No. 15/246,070, filed Aug. 24, 2016, entitled "System for Configuring Distributed Audio Output Using a Designated Audio Device", which is incorporated by reference herein in its entirety. Other example implementations for distributing audio data to a group of audio devices using multicast transmissions are described in U.S. patent application Ser. No. 15/357,579, filed Nov. 21, 2016, entitled "System for Distributing Audio Output Using Multiple Devices", which is incorporated by reference herein in its entirety. In some cases, a group of audio devices may communicate audio data using a combination of multicast transmissions and transmissions via an access point. Example implementations for forming such a group of audio devices are described in U.S. patent application Ser. No. 15/373,677, filed Dec. 9, 2016, entitled "System for Configuring Audio Devices to Distribute Audio Data", and in U.S. patent application Ser. No. 15/421,014, filed Jan. 31, 2017, entitled "System for Distributed Audio Output Using Designated Audio Devices". Application Ser. Nos. 15/373,677 and 15/421,014 are incorporated by reference herein in their entirety.

Each audio device may have an associated packet detection threshold, which may determine the minimum signal strength of interfering packets that are detectable by the audio device. For example, the packet detection threshold for an audio device may determine the minimum signal strength of a data packet, that is not addressed to the audio device, that may cause the audio device to delay transmission of data. Continuing the example, if a detected packet that is not addressed to the audio device has a signal strength less than the packet detection threshold, the audio device may disregard the packet. However, if the packet has a signal strength greater than or equal to the packet detection threshold, the receiving device may delay transmission of other data until a time when the interfering packet is not detected. For example, an audio device having a packet detection threshold of −70 dBm would detect packets having a received signal strength indicator (RSSI) value of greater than or equal to −70 dBm and refrain from transmitting while those packets are detected. The audio device would disregard packets having a RSSI value of less than the threshold value of −70 dBm. In some cases, the packet detection threshold of an audio device may be adjusted. For example, increasing the packet detection threshold of an audio device may prevent the audio device from ceasing transmission when packets having a low RSSI value are detected, which may decrease interference caused by such packets. Decreasing the packet detection threshold of the audio device may enable the audio device to refrain from transmitting when detecting a larger number of interfering packets having low RSSI values. Thus, a decreased packet detection threshold may reduce transmission opportunities and data throughput for the audio device, but may also decrease the number of retransmission attempts undertaken due to packets that were missed by a receiving device due to the interfering packets.

For example, one or more slave devices may be configured to receive audio data from a master device via a multicast transmission. A slave device may determine a signal quality measurement associated with receipt of data from the master device. Signal quality measurements may include a RSSI value, a signal-to-noise ratio (SNR), a packet error rate (PER), a received channel power indicator (RCPI), or other values that may indicate the strength or other characteristics of a received signal. In some implementations, the signal quality measurement determined by a slave device may include a moving average or other mathematical function based on multiple signal quality measurements. For example, a slave device may determine an average RSSI value based on a fixed count of previous RSSI measurements, such as the most recent ten RSSI measurements determined by the slave device. In some cases, the average RSSI value may be weighted based on the time at which each RSSI measurement occurred. For example, a RSSI value that was measured recently may be weighted more heavily than a RSSI value determined less recently.

In addition to the signal quality measurement, based on the received data, the slave device, or another device in communication therewith, may determine the physical data rate used by the master device to transmit the data. Based on the determined physical data rate, the slave device, or another computing device, may determine a minimum SNR that may enable receipt or processing of the received data by the slave device. For example, signals transmitted using a high physical data rate may be received and processed more readily if the SNR value associated with the signals is high, while signals transmitted using a lower physical data rate may be successfully received and processed when the SNR value is lower. In some implementations, each slave device, or an associated computing device, may access a look-up table or other type of data structure that associates physical data rate values with SNR values. In some cases, the associated SNR value may be determined based on the characteristics of the master device and may be the same for each slave device. In other cases, the SNR value may vary between different slave devices depending on the characteristics of each slave device. For example, the SNR value determined for a slave device having multiple antennae may differ from the SNR value for a slave device having a single antenna.

Based on the SNR value determined for a particular slave device and the signal quality measurement determined by that slave device for communications from the master device, the slave device may determine a maximum quantity of interference from an interfering network that may occur without inhibiting receipt of data from the master device. In some implementations, the maximum quantity of interference (MAXINT) may be determined based on a difference between the signal quality measurement for the master device (RSSIMST) device and the SNR for the slave device (SNRSLV), as indicated in equation 1 below.

$$MAXINT = RSSIMST - SNRSLV \qquad \text{(Equation 1)}$$

Each slave device that receives data from a particular master device may determine a maximum quantity of interference specific to that slave device. The maximum quantity of interference may be based on the signal quality measurement for data received, from the master device, by the particular slave device, and by the SNR value determined for the particular slave device.

A slave device may be configured to perform a network scan or similar function to determine one or more networks that may be detected by the slave device. For example, based on the packet detection threshold of the slave device, the slave device may detect data packets transmitted via a network used to communicate with the master device, as well as packets transmitted using one or more other networks that may potentially interfere with the receipt of data from the master device. The slave device may determine a signal quality measurement for each detected network. In some implementations, the slave device, or another computing device in communication therewith, may determine a moving average, or other mathematical function, based on multiple signal quality measurements for a detected network. Networks having a measured RSSI or other signal quality value that exceeds the RSSI or signal quality of signals received from the master device may potentially interfere with the ability of the slave device to receive or process data from the master device. The slave device may provide, to the master device or another computing device in communication therewith, an indication of each network having a signal quality value greater than the measured signal quality value of the master device.

The master device, or another computing device, may generate a list or other data structure that indicates the networks provided by each slave device. In cases where multiple slave devices indicate the same network, the list may be condensed to include only one indication of each network indicated by the slave devices. The master device may then determine a signal quality measurement for each network included in the list. In some implementations, the master device may determine a moving average, or other mathematical function, based on multiple signal quality measurements for each network. The master device, or another computing device, may determine a minimum signal quality value indicated in the list. For example, the minimum signal quality value may include the network having the lowest RSSI value, as measured by the master device, from among each of the networks included in the list or other data structure. The packet detection threshold of the master device may then be configured to a value less than or equal to the minimum signal quality value. For example, the packet detection threshold may be configured to a value equal to the lowest RSSI value for a detected network, minus an offset value, such as 2-3 dB, to account for fluctuations in signal strength. Subsequently, the master device may then determine whether one or more detected networks are currently transmitting packets, and may delay transmission of audio data to an affected slave device until a time when the activity of the detected network(s) ceases or is below a threshold level of activity.

In some implementations, the packet detection threshold of the master device may be retained above a minimum packet detection threshold and less than a maximum packet detection threshold. The maximum packet detection threshold may correspond to the RSSI or other signal quality value associated with receipt of data from an access point, as measured by the master device. For example, if the packet detection threshold of the master device were increased to a level greater than the maximum packet detection threshold, the master device may fail to detect data from the access point. The minimum packet detection threshold may be selected to prevent the master device from reducing transmission responsive to a significant number of networks other than the networks that interfere with the slave devices. For example, reduction of the packet detection threshold of the master device to a level less than the minimum packet detection threshold may cause the master device to detect packet transmission associated with a significant number of extraneous networks that do not interfere with the slave devices. Delaying transmission of audio data based on the activity of extraneous networks may reduce the transmission opportunities of the master device to an extent that would hinder the quality of the audio output.

In some implementations, the minimum packet detection threshold may be modified based on data received from a slave device. For example, a slave device may provide data indicative of the utilization of a particular interfering network. Continuing the example, a utilization value associated with an interfering network may indicate an average airtime utilization of the network, which may indicate a frequency with which the network is used to transmit signals. If the utilization value for an interfering network is greater than a utilization value for other non-interfering networks that may be detected if the detection threshold of the master device were lowered, the minimum packet detection threshold for the master device may be reduced to a level less than or equal to the RSSI of the interfering network. Subsequently, the packet detection threshold of the master device may be reduced to a level that is low enough to detect the interfering network.

In other implementations, the minimum packet detection threshold may be modified based on data determined by the master device. For example, a master device may determine a count of additional, non-interfering networks that would be detected if the packet detection threshold were reduced to a level below the minimum packet detection threshold. If the count of interfering networks that would be detected is greater than or equal to the count of non-interfering networks, the minimum packet detection threshold for the master device may be reduced to a level less than or equal to the RSSI of an interfering network. Subsequently, the packet detection threshold of the master device may be reduced to a level that is low enough to detect the interfering network.

In cases where the minimum packet detection threshold may not be reduced without compromising the transmission opportunities of the master device to an extent that would limit the quality of the audio output, a notification may be generated indicative of the affected slave device(s) or the interfering network(s). In some implementations, data associated with the notification may be used to modify the group of audio devices, such as removing affected slave devices from the group, modifying the particular device(s) that are designated as master devices, or modifying the physical data rate used by one or more master devices.

FIG. 1 depicts an implementation of a system 100 for determining a detection threshold of a master device 102 that may reduce the impact of interference 104 on one or more slave devices 106. In the example system 100, FIG. 1 depicts a group of three audio devices in which a master device 102 is configured to provide audio data 108 to two slave devices 106. However, in other implementations, other types of devices configured to send or receive other types of data may be used. In the system 100 of FIG. 1, the master device 102 may receive the audio data 108 from an external source, such as a server that provides the audio data 108 to the master device 102 via a Wi-Fi access point or a computing device that provides the audio data 108 to the master device 102 via a Bluetooth or Wi-Fi Direct communication link. In other implementations, the master device 102 may access the audio data 108 from a data storage device in communication with the master device 102. The master device 102 may then provide the audio data 108 to the slave devices 106. In some implementations, the master device 102 may transmit the audio data 108 to multiple slave devices 106 using a single multicast transmission. While FIG. 1 depicts the master device 102 and each of the slave devices 106 as freestanding speaker devices, in other implementations, the audio devices may include any type of device that is capable of receiving audio data 108 and generating an audio output. Additionally, while FIG. 1 depicts an example system 100 that includes a single master device 102 and two slave devices 106, in other implementations, any number of master devices 102 may be used to provide audio data 108 to any number of slave devices 106.

In some cases, a slave device 106 may fail to properly receive or process one or more packets of audio data 108 transmitted by the master device 102. For example, the activity of one or more devices associated with an adjacent network 110 may produce interference 104 that mitigates the ability of a slave device 106 to receive or process data from the master device 102. Continuing the example, FIG. 1 depicts a first network 110(1) generating interference 104(1) that may affect the ability of a first slave device 106(1) to receive audio data 108 from the master device 102. FIG. 1 also depicts a second network 110(2) that generates interference 104(2) that may affect the ability of a second slave device 106(2) to receive the audio data 108 from the master device 102. Typically, interference 104 from a network 110 may prevent a slave device 106 from successfully receiving data from a master device 102 if the signal strength of the interference 104, measured by the slave device 106, exceeds the effective signal strength of the data received from the master device 102. For example, as described previously with regard to Equation 1, the maximum signal strength of the interference 104, that would mitigate the ability of a slave device 106 to receive data from the master device 102, may be determined based on the physical data rate used by the master device and the signal strength associated with the signals received from the master device 102.

As such, FIG. 1 depicts the first slave device 106(1) determining first signal quality data 112(1) associated with receipt of the audio data 108 from the master device 102. The first signal quality data 112(1) may include a measurement of signal strength determined by the first slave device 106(1), such as a RSSI or RCPI value. In other implementations, the first signal quality data 112(1) may include one or more other indications of the strength, quality, or other characteristics of the signals received from the master device 102, such as a data throughput value, a packet error rate, a signal-to-noise ratio, and so forth. The second slave device 106(2) may similarly determine signal quality data 112(2) associated with receipt of the audio data 108 from the master device 102. The second signal quality data 112(2) may include different values than those measured by the first slave device 106(1). For example, the second slave device 106(2) may be positioned a greater or lesser distance from the master device 102 compared to the first slave device 106(1), or one or more objects may be positioned between the master device 102 and the second slave device 106(2) that are not present between the master device 102 and the first slave device 106(1). As another example, the second slave device 106(2) may include different components, such as different types or numbers of antennae, wireless radios, and so forth, when compared to the first slave device 106(1), which may affect the received signal strength of data from the master device 102, as measured by the second slave device 106(2). As discussed previously, the signal quality data 112 determined for data received from the master device 102 may be used to determine a maximum signal strength of the interference 104 that may occur without mitigating the ability of a slave device 106 to receive and process data from the master device 102.

To determine whether interference 104 from a network 110 may potentially mitigate the ability of a slave device 106 to receive and process data from the master device 102, the slave devices 106 may also determine signal quality data 112 associated with the interference 104 from the networks 110. For example, FIG. 1 depicts the first slave device 106(1) determining third signal quality data 112(3) indicative of the strength or other characteristics of the interference 104(1) produced by the first network 110(1). FIG. 1 also depicts the second slave device 106(2) determining fourth signal quality data 112(4) indicative of the strength or other characteristics of the interference 104(2) produced by the second network 110(2). While FIG. 1 depicts the first network 110(1) interfering with the first slave device 106(1) and the second network 110(2) interfering with the second slave device 106(2), in other implementations, the first slave device 106(1) may also determine signal quality data 112 associated with the second network 110(2) and the second slave device 106(2) may determine signal quality data 112 associated with the first network 110(1).

If the signal strength indicated by the third signal quality data 112(3) exceeds the maximum quantity of interference 104 determined by the first slave device 106(1), based on the first signal quality data 112(1), the first slave device 106(1) may provide a network indication 114(1), indicative of the first network 110(1), to the master device 102. Similarly, if the signal strength indicated by the fourth signal quality data 112(4) exceeds the maximum quantity of interference 104 determined by the second slave device 106(2), based on the second signal quality data 112(2), the second slave device 106(2) may provide a network indication 114(2), indicative of the second network 110(2), to the master device 102. The network indications 114 may indicate particular networks 110 that interfere with the ability of respective slave devices 106 to receive or process signals from the master device 102.

Based on the network indications 114 received from one or more slave devices 106, the master device 102 may determine signal quality data 112 from at least a portion of the indicated networks 110. For example, FIG. 1 depicts the master device 102 determining fifth signal quality data 112(5) indicative of the strength, or other characteristics, of data packets associated with the first network 110(1), as measured by the master device 102. The master device 102 may also determine sixth signal quality data 112(6) indicative of the strength or other characteristics of data packets associated with the second network 110(2). Based on the network indications 114 and the signal quality data 112 determined from data transmitted by the networks 110, the master device 102 may generate network data 116 indicative of each network 110 indicated by the slave devices 106 that is detectable by the master device 102, and a corresponding signal quality measurement for each network 110 that is determined by the master device 102. For example, FIG. 1 depicts the network data 116 indicating the first network 110(1) and the second network 110(2) and a corresponding RSSI value for each network 110.

After determining the signal quality data 112 for the network(s) 110 indicated by the slave devices 106, the master device 102 may generate a threshold determination 118 based on the network data 116. The threshold determination 118 may indicate a value or modification to a detection threshold of the master device 102 that would enable the master device 102 to detect and modify transmission of data during times when data packets are transmitted by each network 110 indicated by the slave devices 106. For example, FIG. 1 depicts the first network 110(1) having a corresponding RSSI value of −70 and the second network 110(2) having a corresponding RSSI value of −75, as measured by the master device 102. To detect the activity of both the first network 110(1) and the second network 110(2), the master device 102 may set its detection threshold to a value less than or equal to −75. Subsequently, the master device 102 may refrain from transmitting data to one or more of the slave devices 106 if a detected network 110 is currently transmitting data, and may transmit audio data 108 during intervals when the interfering networks 110 are not transmitting. As a result, the ability of the slave devices 106 the successfully receive and process the audio data 108 may not be mitigated by the interference 104 from the networks 110.

Figure 2:
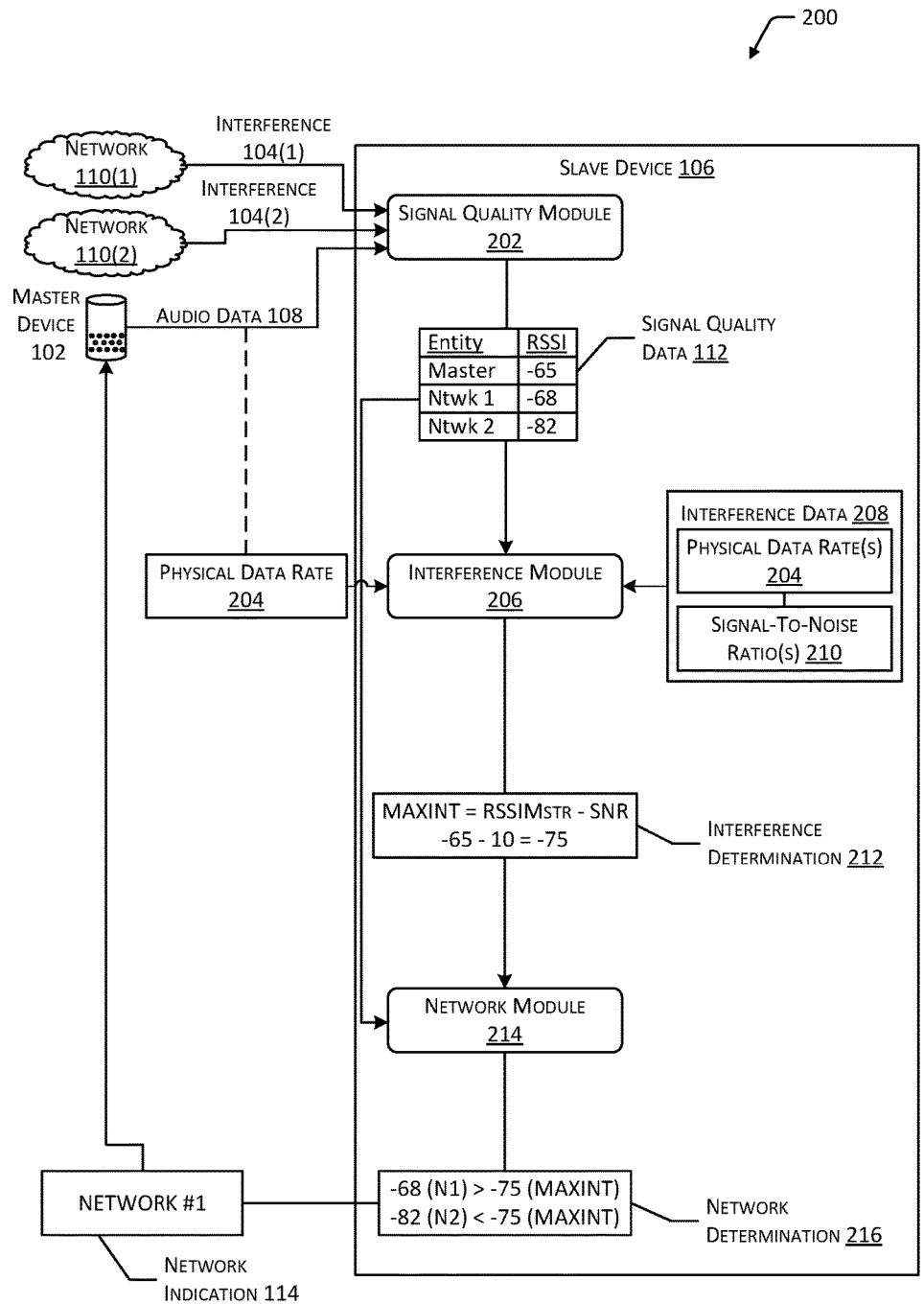
FIG. 2 is a block diagram depicting an implementation of a slave device that may be used within the scope of the present disclosure.

FIG. 2 is a block diagram 200 depicting an implementation of a slave device 106 that may be used within the scope of the present disclosure. As described with regard to FIG. 1, a slave device 106 may be configured to receive audio data 108 from a master device 102, such as via a multicast transmission. In some cases, packets transmitted by one or more networks 110 that are detectable by the slave device 106 may produce interference 104 that mitigates the ability of the slave device 106 to receive or process the audio data 108 form the master device 102.

A signal quality module 202 associated with the slave device 106 may determine signal quality data 112 associated with data received from the master device 102, such as the audio data 108. The signal quality module 202 may also determine signal quality data 112 associated with interference 104 produced by one or more networks 110. For example, FIG. 2 depicts a first network 110(1) generating first interference 104(1) and a second network 110(2) generating second interference 104(2). The signal quality data 112 may indicate a signal strength (e.g., RSSI), or other indicator of the strength or other characteristics of the data associated with the master device 102 and the networks 110. For example, FIG. 2 depicts the signal quality data 112 including a RSSI value for the master device 102, the first network 110(1), and the second network 110(2), as measured by the signal quality module 202 of the slave device 106.

In addition to the RSSI or other type of signal quality data 112, the slave device 106 may determine the physical data rate 204 associated with the transmission of the audio data 108 by the master device 102. For example, an interference module 206 associated with the slave device 106, or the signal quality module 202, may determine the physical data rate 204 based on one or more transmissions received from the master device 102. In other implementations, the master device 102 or another computing device may provide an indication of the physical data rate 204 to the slave device 106. The interference module 206 may access interference data 208, which may associate particular physical data rates 204 with corresponding signal-to-noise ratios 210. Based on correspondence between the physical data rate 204 used by the master device 102 and the interference data 208, the interference module 206 may determine a particular signal-to-noise ratio 210 that corresponds to the physical data rate 204 used by the master device 102. As described previously with reference to Equation 1, the signal quality data 112, such as a RSSI value associated with transmissions by the master device 102, and the determined signal-to-noise ratio 210 may be used to determine a maximum quantity of interference 104 from an interfering network 110 that may occur without inhibiting receipt of data, by the slave device 106, from the master device 102. For example, the interference module 206 may generate an interference determination 212 indicative of the maximum quantity of interference 104. Continuing the example, FIG. 2 indicates a RSSI value of −65 for data received from the master device 102, as measured by the slave device 106, and a signal-to-noise ratio 210 of 10 that corresponds to the physical data rate 204 used by the master device 102. Based on these values, the interference determination 212 may indicate a maximum quantity of interference 104 of −75. Therefore, interference 104 from a network 110 having a RSSI or other signal quality value greater than −75 may mitigate the ability of the slave device 106 to receive or process audio data 108 from the master device 102. In other implementations, the interference determination 212 may be generated without determining a signal-to-noise ratio 210. For example, the interference determination 212 may be determined based on the RSSI value for signals received, minus a threshold value.

A network module 214 associated with the slave device 106 may determine correspondence between the maximum quantity of interference 104 and the signal quality data 112. For example, the network module 214 may determine whether a RSSI value for the interference 104 produced by one or more networks 110 is greater than or equal to the maximum quantity of interference 104 determined by the interference module 206. FIG. 2 depicts the network module 214 generating a network determination 216 indicating that the RSSI value for the first network 110(1) exceeds the maximum quantity of interference 104, while the RSSI value for the second network 110(2) is less than the maximum quantity of interference 104. The network determination 216 may indicate that transmissions by devices associated with the first network 110(1) may mitigate the ability of the slave device 106 to receive or process data from the master device 102 because, as measured by the slave device 106, transmissions of the first network 110(1) are stronger than transmissions by the master device 102. The network determination 216 may indicate that transmissions by devices associated with the second network 110(2) will not significantly impact the ability of the slave device 106 to receive or process data from the master device 102 because, as measured by the slave device 106, transmissions of the second network 110(2) are weaker than transmissions by the master device 102.

Based on the network determination 216, the slave device 106 may provide a network indication 114 to the master device 102 indicating one or more networks 110 that exceed the maximum quantity of interference 104. For example, FIG. 2 depicts the slave device 106 providing a network indication 114 that indicates the first network 110(1) but does not indicate the second network 110(2). As described with regard to FIG. 1, the master device 102 may modify a detection threshold, if necessary, to detect transmissions associated with the first network 110(1) and delay transmission of audio data 108 to the slave device 106 when the first network 110(1) is transmitting data.

Figure 3:
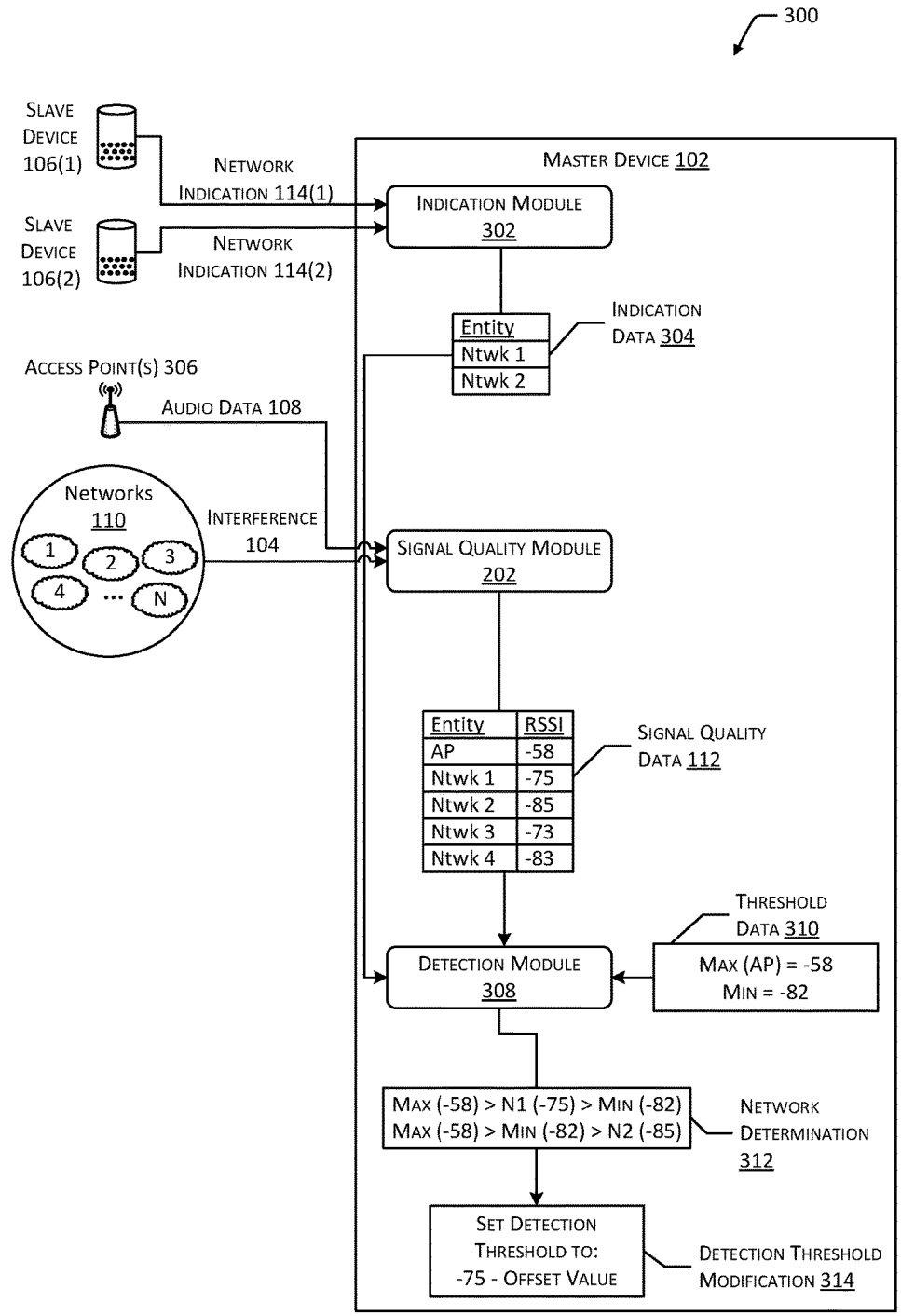
FIG. 3 is a block diagram depicting an implementation of a master device that may be used within the scope of the present disclosure.

FIG. 3 is a block diagram 300 depicting an implementation of a master device 102 that may be used within the scope of the present disclosure. As discussed with regard to FIGS. 1 and 2, a master device 102 may provide audio data 108 to one or more slave devices 106. In some cases, one or more networks 110 may generate interference 104 that may mitigate the ability of one or more of the slave devices 106 to receive or process audio data 108 from the master device 102. In such cases, the slave device(s) 106 may determine particular networks 110 that interfere with the ability of the slave device(s) 106 to receive or process the audio data 108 and provide network indications 114 indicative of the interfering networks 110 to the master device 102. For example, FIG. 3 depicts an indication module 302 associated with the master device 102 receiving a first network indication 114(1) from a first slave device 106(1) and a second network indication 114(2) from a second slave device 106(2). While FIG. 3 depicts two slave devices 106 each providing a single network indication 114 to the master device 102, in other implementations, any number of slave devices 106 may indicate any number of networks 110 to the master device 102. Based on the network indications 114, the indication module 302 may generate indication data 304. The indication data 304 may include a list or other data structure that includes an identifier or indicator associated with each network 110 indicated by the slave devices 106.

The master device 102 may also include a signal quality module 202, which may determine signal quality data 112 for each network 110 that is detectable by the master device 102. The network(s) 110 that may be detected by the master device 102 may include the networks 110 included in the indication data 304. In some cases, the master device 102 may detect one or more additional networks that may not necessarily interfere with the ability of the slave device(s) 106 to receive or process data from the master device 102. In some cases, one or more networks 110 indicated by the slave devices 106 may not be detectable by the master device 102. For example, the master device 102 may be positioned a greater distance from a particular network 110 than an affected slave device 106, such that the master device 102 is unable to detect the transmission of data by the network 110. The signal quality module 202 may also determine signal quality data 112 associated with data received from one or more access points 306. For example, a master device 102 may be configured to receive audio data 108 via an access point 306 for distribution to slave devices 106. The signal quality data 112 may therefore indicate a RSSI value, or other indications of the strength or other characteristics of transmissions, for the access point(s) 306 and each of the networks 110 that is detectable by the master device 102.

Based on the indication data 304 and the signal quality data 112, a detection module 308 associated with the master device 102 may modify a detection threshold of the master device 102 to enable the master device 102 to detect at least a subset of the networks 110 that interfere with the slave devices 106. For example, the signal quality data 112 may include indications of multiple networks 110 and corresponding RSSI values for each network 110. The detection module 308 may determine correspondence between the networks 110 included in the indication data 304 and the networks 110 included in the signal quality data 112 to determine the RSSI values associated with each network of the indication data 304. The detection module 308 may then determine the smallest RSSI value associated with a network 110 included in the indication data 304. This value may indicate the level to which the detection threshold of the master device 102 may be set to enable the master device 102 to cease transmission based on the activity of each interfering network 110.

However, in some implementations, the detection module 308 may access threshold data 310, which may indicate one or more minimum or maximum values for the detection threshold of the master device 102. For example, the threshold data 310 may indicate a maximum value for the detection threshold that is greater than or equal to the RSSI value for the access point(s) 306. Preventing the detection threshold of the master device 102 from being increased to a level greater than the RSSI value for the access point(s) 306 may enable the master device 102 to continue detecting transmissions of the access point(s) 306. The threshold data 310 may indicate a minimum value for the detection threshold that may be selected to reduce the detection of a large number of extraneous networks 110 by the master device 102. For example, FIG. 3 indicates a minimum threshold value of −82. Decreasing the detection threshold of the master device 102 below this level may cause the master device 102 to detect a large number of networks 110. If the master device 102 were to delay transmission of signals based on the activity of the large number of networks 110, the transmission opportunities for the master device 102 may be limited to an extent that the quality of an audio output would be negatively affected.

The detection module 308 may generate a network determination 312 based on the signal quality data 112, the indication data 304, and the threshold data 310. For example, the detection module 308 may determine correspondence between the RSSI values for each network 110 of the indication data 304 and the threshold data 310. Continuing the example, FIG. 3 depicts the network determination 312 indicating that the RSSI value for the first network 110(1) is greater than a minimum threshold value and less than a maximum threshold value. The network determination 312 also indicates that the RSSI value for the second network 110(2) is less than the minimum threshold value. Based on the network determination 312, the detection module 308 may generate a detection threshold modification 314. In the depicted example, the detection threshold modification 314 may be configured to set the detection threshold of the master device 102 to a value equal to the RSSI value of the first network 110(1), minus an offset value, such as 2 to 3 dB. Because the RSSI value for the second network 110(2) is less than the minimum threshold value, the detection threshold of the master device 102 may not be modified to account for the second network 110(2). Modification of the detection threshold may cause the master device 102 to cease transmission during the transmission of packets by the first network 110(1), as well as signals transmitted by other networks 110 having a RSSI value greater than the detection threshold. The master device 102 may disregard data packets transmitted by the second network 110(2), and one or more other networks 110 having a RSSI value less than the detection threshold.

Figure 4:
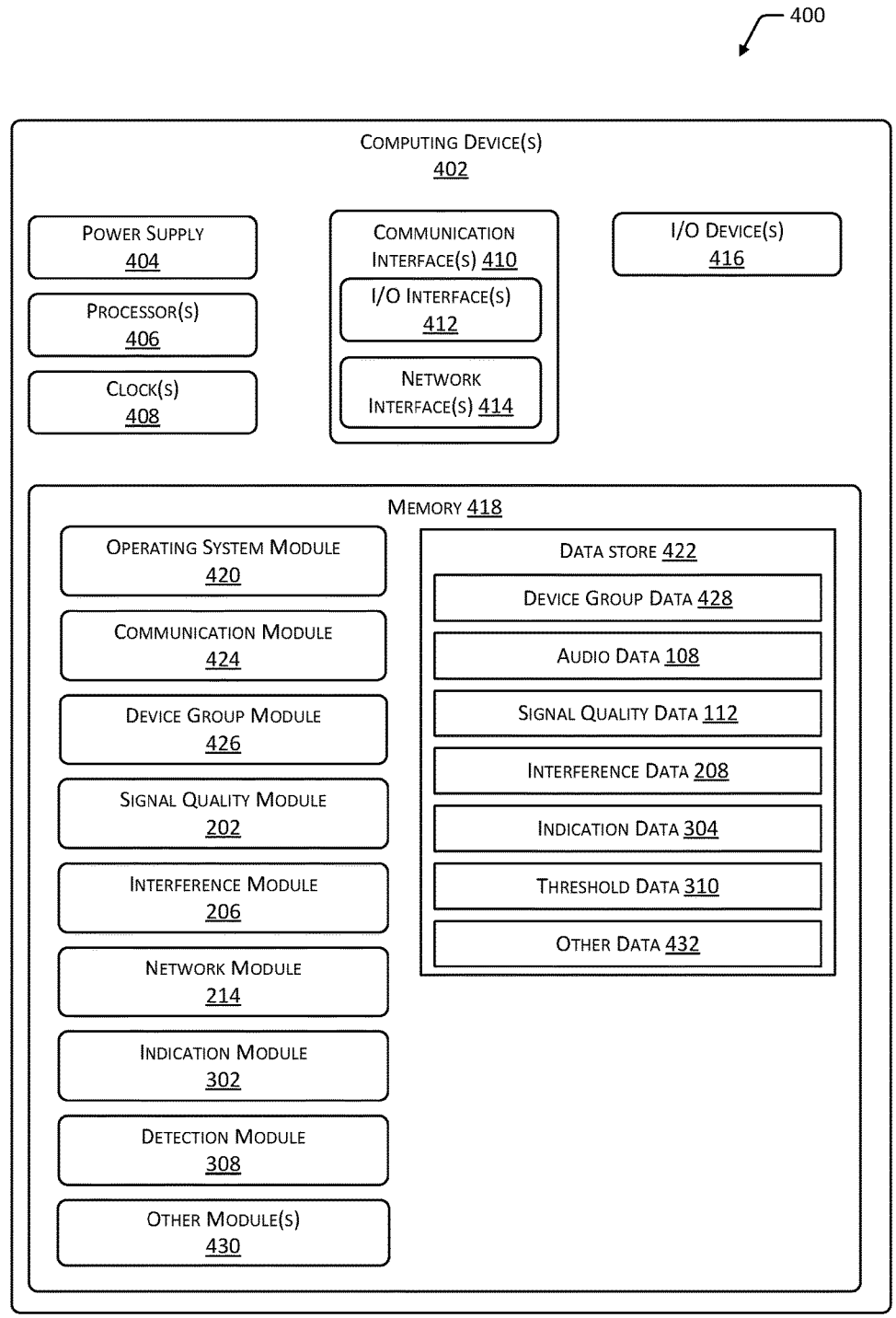
FIG. 4 is a block diagram depicting an implementation of one or more computing devices within the scope of the present disclosure.

FIG. 4 is a block diagram 400 depicting an implementation of one or more computing devices 402 within the scope of the present disclosure. While FIG. 4 depicts a single block diagram 400, the depicted computing device 402 may include any number of computing devices 402 and any type of computing devices 402. For example, the depicted computing device(s) 402 may include a combination of one or more master devices 102 and slave devices 106 as depicted in FIG. 1. As another example, the depicted computing device(s) 402 may include one or more servers or other types of computing devices in communication with one or more audio devices. As yet another example, the depicted computing device(s) 402 may include a combination of audio devices and other computing devices 402 in communication therewith. In other implementations, the computing device(s) 402 may include devices other than audio devices that are configured to transmit or receive any type of data. For example, a computing device 402 may include, without limitation, a server, a desktop, laptop, or other type of personal computer, a smartphone, notebook, tablet computer, palm-top computer, or other type of portable computing devices, a wearable computing device, an automotive computing device, a gaming system, a smart television, a set-top box, and so forth.

The computing device(s) 402 may include one or more power supplies 404 configured to provide electrical power suitable for operating the components of the computing device(s) 402. In some implementations, the power supply 404 may include a rechargeable battery, fuel cell, photovoltaic cell, power conditioning circuitry, and so forth.

The computing device(s) 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock(s) 408 to generate a timestamp, trigger a preprogrammed action, and so forth.

The computing device(s) 402 may include one or more communication interfaces 410, such as input/output (I/O) interfaces 412, network interfaces 414, and so forth. The communication interfaces 410 may enable the computing device(s) 402, or components thereof, to communicate with audio devices and other computing devices 402, or components thereof. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the computing device(s) 402. For example, I/O devices 416 may include touch sensors, keyboards, mouse devices, microphones, image sensors (e.g., cameras), scanners, displays, speakers, haptic devices, printers, motion sensors, location sensors, and so forth. In some implementations, the I/O devices 416 may be physically incorporated with a computing device 402 or may be externally placed.

The network interfaces 414 may be configured to provide communications between the computing device(s) 402 and other devices, such as the I/O devices 416, routers, access points 306, and so forth. The network interfaces 414 may include devices configured to couple to one or more networks including local area networks (LANs), wireless LANs, wide area networks (WANs), wireless WANs, and so forth. For example, the network interfaces 414 may include computing devices 402 compatible with Ethernet, Wi-Fi, Wi-Fi Direct, Bluetooth, Bluetooth Low Energy, ZigBee, Z-Wave, 3G, 4G, LTE, and so forth.

The computing device(s) 402 may include one or more busses or other internal communications hardware or software that allows for the transfer of data between the various modules and components of the computing device(s) 402.

As shown in FIG. 4, the computing device(s) 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device(s) 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSDProject; UNIX or a UNIX-like operating system; a variation of the Linux operating system as promulgated by Linus Torvalds; the Windows operating system from Microsoft Corporation of Redmond, Wash., USA; or other operating systems.

A data store 422 and one or more of the following modules may also be stored in the memory 418. The modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including other computing devices 402, network attached storage devices, and so forth.

A communication module 424 stored in the memory 418 may be configured to establish communications with audio devices, servers, external devices, or other computing devices 402.

The memory 418 may also store a device group module 426. The device group module 426 may access device group data 428 that indicates one or more audio devices to be used to provide an audio output. In some implementations, the device group module 426 may be configured to provide a user interface, receive user input indicative of one or more audio devices, and store the user input as device group data 428. For example, user input may be used to select particular audio devices for use providing an audio output. Continuing the example, a user may select a first group of audio devices located on the first floor of a dwelling to provide a first audio output, and a second group of audio devices located on the second floor of the dwelling to provide a different audio output. Device identifiers indicative of the audio devices selected for each group may be stored as device group data 428. In some implementations, the user interface may also receive user input indicative of the audio data 108 to be used to generate the audio output. For example, the audio data 108 may include one or more of an application or audio content that may be used to cause one or more audio devices to emit sound.

In other implementations, the device group data 428 may include preexisting, default data indicating one or more audio devices. In still other implementations, the device group module 426 may be configured to generate device group data 428 based on characteristics of the audio data 108 or one or more of the audio devices. For example, based on one or more rules or threshold values, the device group module 426 may determine audio devices having a data throughput or other indication of signal quality that exceeds a threshold value, or audio devices having a packet error rate or predicted airtime use that is less than a threshold, and generate device group data 428 indicative of these audio devices.

The memory 418 may also store the signal quality module 202. The signal quality module 202 may determine signal quality data 112 associated with data transmitted by one or more devices or networks 110. For example, a signal quality module 202 associated with a slave device 106 may determine a RSSI value or other indication of the strength, or other characteristics, of the transmission of data packets detected by the slave device 106. Continuing the example, the signal quality module 202 may determine a RSSI value for audio data 108 transmitted from a master device 102 to the slave device 106, as well as RSSI values for interference 104 associated with transmissions of one or more other networks 110. As another example, a signal quality module 202 associated with a master device 102 may determine a RSSI value or other indication of the strength, or other characteristics, of data received from an access point 306, as well as RSSI values for interference 104 associated with other networks 110.

The memory may further store the interference module 206. The interference module 206 may determine a maximum quantity of interference 104 (e.g., a RSSI value or similar measurement of the strength or other quality of interference 104 associated with a network 110) that may be present without mitigating the ability of a slave device 106 to receive and process data from a master device 102. The maximum quantity of interference 104 may be determined based on the RSSI value or other signal quality measurement associated with data received from the master device 102, and the physical data rate used by the master device 102 to transmit data. For example, the interference module 206 may access interference data 208, which associates one or more physical data rates 204 with corresponding signal-to-noise ratios 210. Based on the signal-to-noise ratio 210 that corresponds to the physical data rate 204 used by the master device 102 and the RSSI value associated with the master device 102, the interference module 206 may generate an interference determination 212 indicative of the maximum quantity of interference 104. For example, the maximum quantity of interference 104 may be determined using Equation 1, described previously.

The memory 418 may additionally store the network module 214. The network module 214 may determine one or more networks 110 having an associated RSSI value or other signal quality measurement that exceeds the maximum quantity of interference 104 determined by the interference module 206. For example, the network module 214 may determine correspondence between signal quality data 112, determined by the signal quality module 202, and the interference determination 212, generated by the interference module 206. This correspondence may indicate particular networks 110 having a signal quality value that exceeds the maximum quantity of interference 104. The network module 214 may provide a network indication 114, indicative of these networks 110, to a master device 102 or another computing device 402 in communication with the master device 102.

The memory 418 may also store the indication module 302. The indication module 302 may receive network indications 114 from one or more slave devices 106 and generate indication data 304 indicative of each network 110 indicated by the slave devices 106. In some cases, a particular network 110 may be indicated by multiple slave devices 106. To reduce redundancy and increase efficiency, the indication module 302 may be configured to include only a single indication of the particular network 110 in the indication data 304. For example, the indication module 302 may determine correspondence between a received network indication 114 and existing indication data 304 to determine whether a network 110 indicated in the network indication 114 is already included in the indication data 304.

The memory 414 may store the detection module 308, which may modify the detection threshold of a master device 102. The detection module 308 may determine correspondence between the indication data 304 and signal quality data 112 determined by the signal quality module 202. The signal quality data 112 may be indicative of RSSI values or other signal quality measurements determined by a master device 102, for one or more networks 110 detectable by the master device 102. Correspondence between the indication data 304 and signal quality data 112 may determine a minimum RSSI value or other signal quality measurement associated with the networks 110 indicated in the indication data 304. In some cases, the detection module 308 may set the detection threshold of the master device 102 to a level less than or equal to the determined minimum RSSI value. In other implementations, the detection module 308 may determine correspondence between the minimum RSSI value and threshold data 310 indicative of minimum and maximum values for the detection threshold. If setting the detection threshold of the master device 102 to the determined minimum RSSI value would reduce the detection threshold below a threshold minimum value, the detection module 308 may instead determine the smallest RSSI value corresponding to a network 110 in the indication data 304 that is larger than the minimum threshold value.

Other modules 430 may also be present in the memory 418. For example, encryption modules may be used to encrypt and decrypt communications between computing devices 402. The other modules 430 may also include modules for receiving user input to configure parameters of audio devices, set threshold values of the threshold data 310, and so forth. Other modules 430 may further include location modules that may be used to determine the location of particular audio devices relative to other audio devices or access points 306. Other modules 430 may additionally include modules used to synchronize and control an audio output, such as by modifying a timing or a volume of particular audio signals.

Other data 432 within the data store 422 may include user input data, such as configurations and settings associated with computing devices 402. Other data 432 may also include security data, such as encryption keys and schema, access credentials, and so forth. Other data 432 may additionally include rules, algorithms, and so forth used to synchronize and control audio output, such as by determining time delays between the emissions of sounds based on the locations of audio devices.

In different implementations, different computing devices 402 may have different capabilities or capacities. For example, servers may have significantly more processor 406 capability and memory 418 capacity compared to the processor 406 capability and memory 418 capacity of audio devices.

Figure 5:
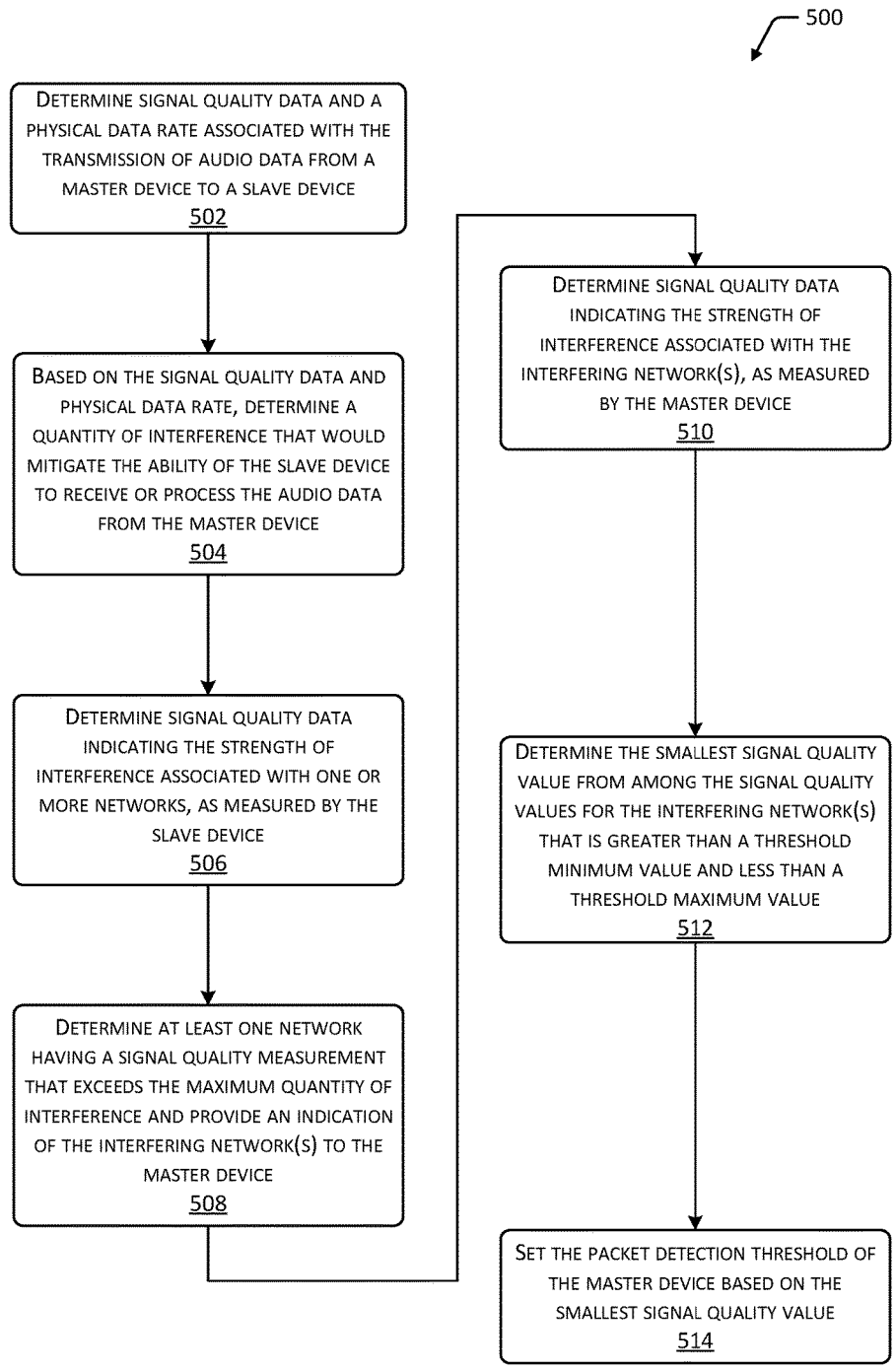
FIG. 5 is a flow diagram illustrating a method for modifying the detection threshold of a master device based on interfering networks affecting one or more slave devices.

FIG. 5 is a flow diagram 500 illustrating a method for modifying the detection threshold of a master device 102 based on interfering networks 110 affecting one or more slave devices 106. Block 502 determines signal quality data 112 and a physical data rate 204 associated with the transmission of audio data 108 from a master device 102 to a slave device 106. For example, a master device 102 may be configured to transmit audio data 108 to one or more slave devices 106 via a multicast transmission using a particular physical data rate 204. A slave device 106 receiving the audio data 108 may determine a RSSI value or other indication of signal strength or quality, as well as the physical data rate 204 used to transmit the audio data 108.

Block 504 determines a quantity of interference 104 that would mitigate the ability of the slave device 106 to receive or process the audio data 108 from the master device 106. The quantity of interference 104 may be determined based on the signal quality data 112 and physical data rate determined based on the signals received from the master device 102. For example, the quantity of interference 104 may include a RSSI value or other indication of signal strength or quality, associated with interference 104, that would be received by a slave device 106 more strongly than data from the master device 102. Continuing the example, in some implementations, the quantity of interference 104 may be determined based on a RSSI value associated with data received from the master device 102 and a signal-to-noise ratio 210 that may be determined based on the physical data rate 204 used by the master device 102. As described with regard to FIG. 2, interference data 208 that associates particular physical data rates 204 with corresponding signal-to-noise ratios 210 may be used to determine a particular signal-to-noise ratio 210 that corresponds to the physical data rate 204 used by the master device 102. The maximum quantity of interference 104 may be determined based at least in part on the difference between the RSSI value for the master device 102 and the signal-to-noise ratio 210, as indicated in Equation 1.

Block 506 determines signal quality data 112 indicating the strength of interference 104 associated with one or more networks 110, as measured by the slave device 106. For example, a slave device 106 may detect the transmission of packets by one or more networks 110, which may function as interference 104 that affects the ability of the slave device 106 to receive or process other packets that are weaker than the interference 104. The signal quality data 112 may include a RSSI value or other indication of signal strength associated with the interference 104 produced by the network(s) 110.

Block 508 determines at least one network 110 having a signal quality measurement that exceeds the maximum quantity of interference 104 and provides an indication of the interfering network(s) 110 to the master device 102. As described with regard to FIGS. 1 and 2, a slave device 106, or another computing device 402 in communication therewith, may determine correspondence between the maximum quantity of interference 104 and the signal quality data 112 associated with at least a subset of the detected networks 110. Networks 110 having an associated RSSI value or other indication of signal strength or quality that is greater than the maximum quantity of interference 104 may mitigate the ability of a slave device 106 to receive audio data 108 from the master device 102. The slave device 106 or other computing device 402 in communication therewith may provide a network indication 114 indicating the interfering network(s) 110 to the master device 102, or to another computing device 402 in communication with the master device 102.

Block 510 determines signal quality data 112 indicating the strength of the interference 104 associated with the interfering network(s) 110, as measured by the master device 102. As described with regard to FIGS. 1 and 3, responsive to one or more network indications 114 received from one or more slave devices 106, a master device 102 may determine RSSI values or other indications of signal quality for at least a subset of the networks 110 that are detectable by the master device 102. In some cases, the detected networks 110 may include one or more additional networks 110 other than those associated with the network indications 114. Additionally, in some cases, one or more networks 110 indicated by a slave device 106 may not be detectable by the master device 102.

Block 512 determines the smallest signal quality value from among the signal quality values for the interfering networks 110 that is greater than a threshold minimum value and less than a threshold maximum value. For example, the master device 102, or another computing device 402 in communication therewith, may determine correspondence between the RSSI values or other signal quality measurements for the interfering network(s) 110 and threshold data 310 indicative of a threshold minimum value. This correspondence may indicate the smallest RSSI value associated with an interfering network 110 that is greater than the threshold minimum value. Block 514 sets the packet detection threshold of the master device 102 based on the smallest RSSI value. For example, the packet detection threshold of the master device 102 may be set at an amount equal to the smallest RSSI value determined in block 512, minus an offset value, such as 2-3 dB, to account for fluctuations in signal quality.

Figure 6:
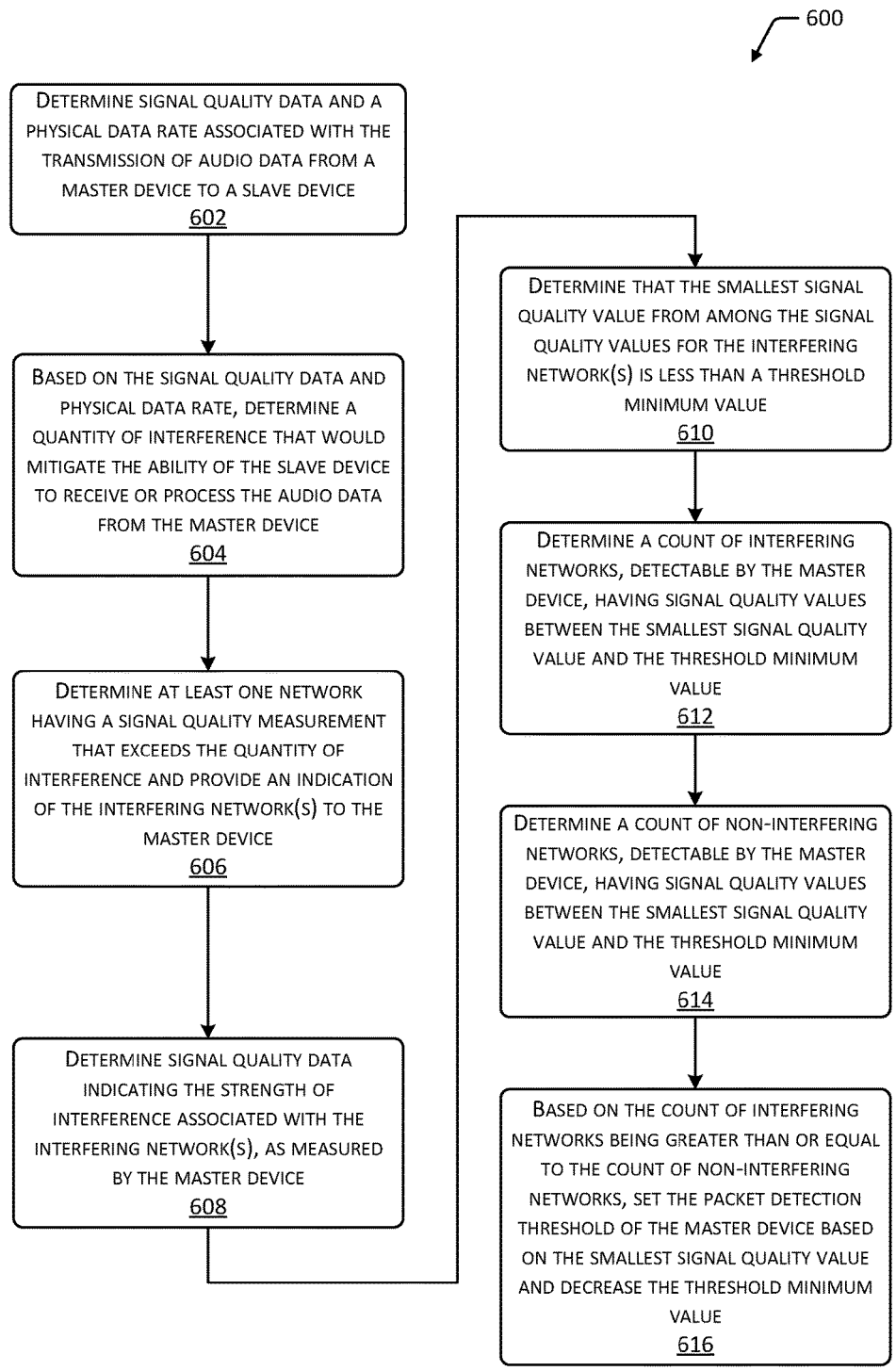
FIG. 6 is a flow diagram illustrating an implementation of a method for modifying a threshold minimum value for a detection threshold of a master device based on a count of additional networks that may be detected by the master device.

FIG. 6 is a flow diagram 600 illustrating an implementation of a method for modifying a threshold minimum value for a detection threshold of a master device 102 based on a count of additional networks 110 that may be detected by the master device 102. Block 602 determines signal quality data 112 and a physical data rate 204 associated with the transmission of audio data 108 from a master device 102 to a slave device 106. For example, a slave device 106 may determine a RSSI value or other signal quality measurement associated with transmissions received from a master device 102. The slave device 106 may also determine the physical data rate 204 used by the master device 102 based on the transmissions, or the master device 102 may indicate the physical data rate 204 to the slave device 106.

Block 604 determines a quantity of interference 104 that would mitigate the ability of the slave device 106 to receive or process the audio data 108 from the master device 102. As described with regard to FIGS. 1, 2, and 5, the quantity of interference 104 may be determined based on the signal quality data 112 and physical data rate 204 used by the master device 102. The quantity of interference 104 may include a RSSI value or other indication of signal strength or quality, associated with interference 104, that would be received by a slave device 106 more strongly than data from the master device 102.

Block 606 determines at least one network 110 having a signal quality measurement that exceeds the quantity of interference 104 determined in block 604, and provides an indication of the interfering network(s) 110 to the master device 102. For example, a slave device 106 may determine correspondence between the RSSI values measured for interference 104 received from one or more networks 110 and the maximum quantity of interference 104 determined in block 604. A network indication 114 for at least a subset of the networks 110 having RSSI values that exceed the maximum quantity of interference 104 may be provided to the master device 102.

Block 608 determines signal quality data 112 indicating the strength of the interference 104 associated with the interfering network(s) 110, as measured by the master device 102. For example, responsive to receipt of one or more network indications 114, a master device 102 may determine the RSSI values or other indications of signal quality associated with the network(s) 110 that are detectable by the master device 102. One or more of the detected networks 110 may include at least a portion of the networks 110 indicated by the slave devices 106.

Block 610 determines that the smallest signal quality value from among the signal quality values for the interfering network(s) 110 is less than a threshold minimum value. For example, the master device 102 may determine correspondence between the RSSI values for each detected interfering network 110 and threshold data 310 that includes a threshold minimum value. In some cases, the signal quality values associated with one or more interfering networks 110 may be less than the threshold minimum value.

Block 612 determines a count of interfering networks, detectable by the master device 102, having signal quality values between the smallest signal quality value determined in block 610 and the threshold minimum value. In some cases, use of a threshold minimum value for the detection threshold of a master device 102 may prevent the master device 102 from delaying transmission of data due to the transmissions of a large number of networks 110. For example, delaying transmission of audio data 108 based on the transmissions of a large number of other networks 110 may limit the transmission opportunities of the master device 102 to an extent that would negatively impact the quality of an audio output. However, in other cases, only a small number of additional networks 110 may be detected by the master device 102 if the detection threshold thereof were decreased to a level below the threshold minimum value.

Some of the additional networks 110 that would be detected by the master device 102 if the detection threshold thereof were to be decreased may include the interfering networks 110, while other additional networks 110 may include non-interfering networks 110. For example, block 614 determines a count of non-interfering networks 110, detectable by the master device 102, having signal quality values between the smallest signal quality value determined in block 610 and the threshold minimum value. Interfering networks 110 and non-interfering networks 110 may be identified by determining correspondence between the network indications 114 provided by slave devices 106 to the master device 102 and the networks 110 that are detectable by the master device 102. Detected networks 110 that correspond to a received network indication 114 may be interfering networks 110 while detected networks 110 that do not correspond to a received network indication 114 may be non-interfering networks 110.

Block 616 sets the packet detection threshold of the master device 102 based on the smallest signal quality value determined in block 610 and decreases the threshold minimum value. The packet detection threshold of the master device 102 may be decreased based on a determination that the count of interfering networks 110 determined in block 612 is greater than or equal to the count of non-interfering networks 110 determined in block 14. In other implementations, in cases where decreasing the detection threshold of the master device 102 does not cause the master device 102 to detect more than a threshold number of additional networks 110, the detection threshold of the master device 102 may be decreased to a value less than a threshold minimum value. In such implementations, block 614 may be omitted.

Figure 7:
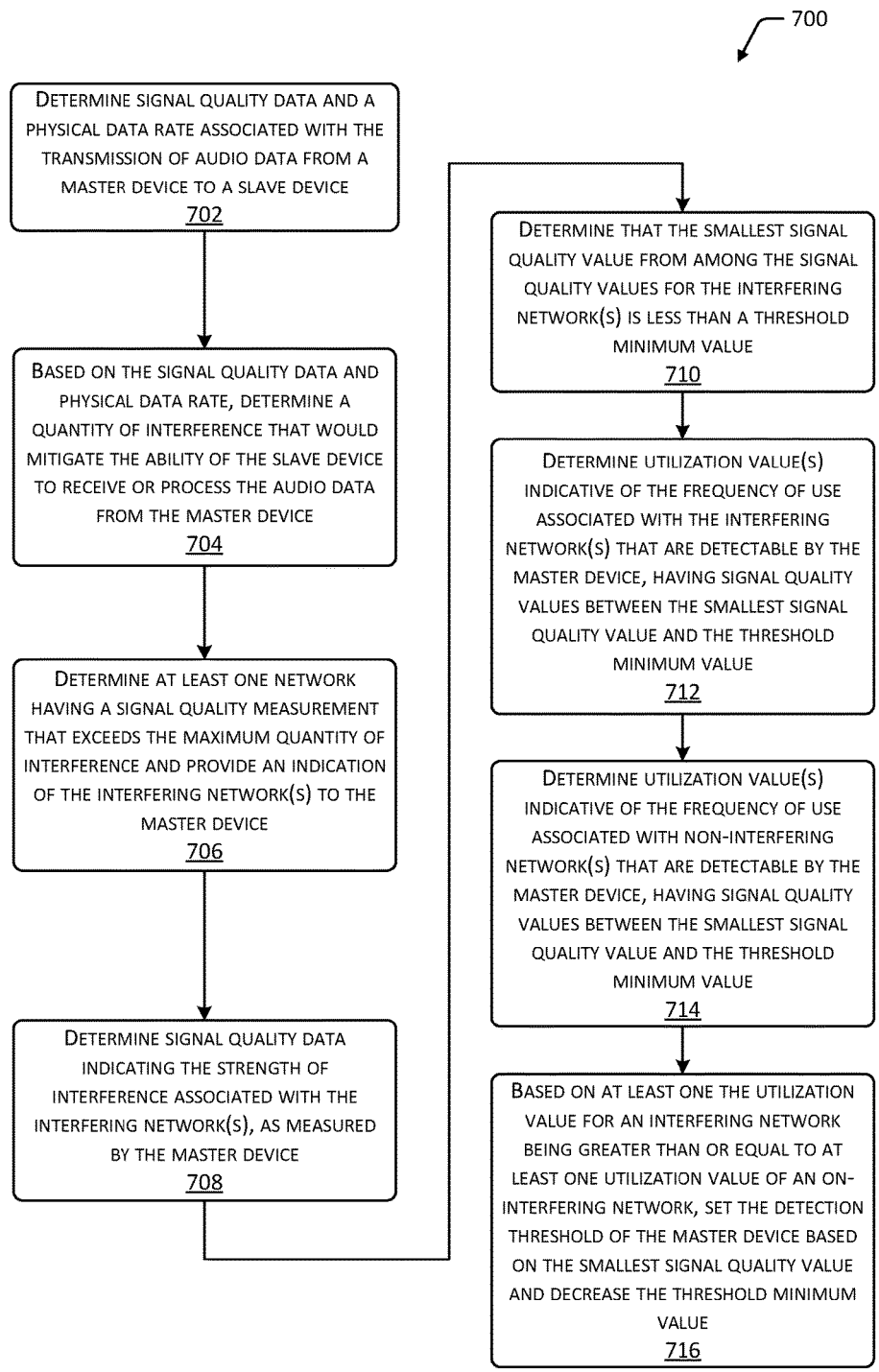
FIG. 7 is a flow diagram illustrating a method for modifying a threshold minimum value for a detection threshold of a master device based on the frequency of use associated with one or more networks.

FIG. 7 is a flow diagram 700 illustrating a method for modifying a threshold minimum value for a detection threshold of a master device 102 based on the frequency of use associated with one or more networks 110. Block 702 determines signal quality data 112 and a physical data rate 204 associated with the transmission of audio data 108 from a master device 102 to a slave device 106. As described with regard to FIGS. 1, 2, 5, and 6, the signal quality data 112 may include a RSSI value or other indication of signal quality, measured by a slave device 106, for data received from a master device 102.

Block 704 determines a quantity of interference 104 that would mitigate the ability of the slave device 106 to receive or process the audio data 108 from the master device 102. The quantity of interference 104 may be determined based on the signal quality data 112 and physical data rate 204 determined based on the data received from the master device 102. For example, the quantity of interference 104 may be determined, at least in part, based on Equation 1, which determines a difference between the RSSI value for the master device 102 and a signal-to-noise ratio 210 that corresponds to the physical data rate 204 used by the master device 102.

Block 706 determines at least one network 110 having a signal quality measurement that exceeds the maximum quantity of interference 104 and provides an indication of the interfering network(s) 110 to the master device 102. For example, based on correspondence between the RSSI values or other signal quality measurements determined for one or more networks 110, a slave device 106 may determine at least one network 110 having an RSSI value greater than the maximum quantity of interference 104. The slave device 106 may provide a network indication 114 indicative of the network(s) 110 to the master device 102.

Block 708 may determine signal quality data 112 indicating the strength of the interference 104 associated with the interfering network(s) 110, as measured by the master device 102. Responsive to receipt of one or more network indications 114 from one or more slave devices 106, a master device 102 may determine RSSI values or other indications of signal quality associated with the network(s) 110 that are detectable by the master device 102. One or more of the detected networks 110 may include at least a portion of the networks 110 indicated by the slave devices 106.

Block 710 may determine that the smallest signal quality value, from among the signal quality values for the interfering network(s) 110, is less than a threshold minimum value. As described with regard to FIG. 6, in some cases, use of a threshold minimum value to limit the detection threshold of a master device 102 may prevent the master device 102 from reducing transmission opportunities due to the transmissions of a large number of networks 110. However, in some cases, a particular interfering network 110 may frequently transmit signals, as indicated by the corresponding utilization value, and if the master device 102 does not account for transmissions of the particular network 110, transmissions of audio data 108 to the affected slave device 106 may frequently fail.

Block 712 determines one or more utilization values indicative of the frequency of use associated with interfering network(s) 110 that are detectable by the master device 102 and have signal quality values between the smallest signal quality value and the threshold minimum value. For example, a slave device 106, or another computing device 402 in communication therewith, may determine a quantity of airtime used by one or more interfering network(s) 110 or other metrics indicative of use of the interfering network(s) 110. The slave device 106 or other computing device 402 may determine respective utilization values for any number of interfering networks 110 based on these determinations, the utilization value(s) indicating the frequency of use of the network(s) 110.

Block 714 determines one or more utilization values indicative of the frequency of use associated with non-interfering network(s) 110 that are detectable by the master device 102 and have signal quality values between the smallest signal quality value and the threshold minimum value. For example, the master device 102, or another computing device 402 in communication therewith, may determine a quantity of airtime used by one or more non-interfering network(s) 110 or other metrics indicative of use of the non-interfering network(s) 110. As described with regard to FIG. 6, interfering networks 110 and non-interfering networks 110 may be determined based on correspondence between the network indications 114 received from the slave device(s) 106 and the networks 110 that are detectable by the master device 102.

Block 716 sets the detection threshold of the master device 102 based on the smallest signal quality value determined in block 712 and decreases the threshold minimum value. The reduction of the detection threshold may occur based on the utilization value for at least one interfering network 110 being greater than or equal to the utilization value for at least one non-interfering network 110. Reduction of the detection threshold to an amount less than the threshold minimum value may cause the master device 102 to detect additional networks 110, which may reduce the opportunities for the master device 102 to transmit the audio data 108 to the slave device 106. However, restricting transmission based on the activity of an interfering network 110 having a large frequency of use may result in the avoidance of a greater number of failed transmissions by the master device 102 than the opportunities for transmission that may be lost by detecting non-interfering networks 110. In other implementations, the detection threshold of the master device 102 may be decreased based on the utilization value for an interfering network 110 exceeding a threshold utilization value. In such cases, block 714 may be omitted.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a master device;
a slave device configured to receive audio data from the master device;
one or more memories storing computer-executable instructions; and
one or more hardware processors to execute the computer-executable instructions to:
determine, using the slave device, a signal quality measurement associated with transmission of a signal from the master device to the slave device;
based on the signal quality measurement, determine a threshold signal strength of an interfering network that prevents the slave device from receiving the audio data from the master device;
determine, using the slave device, a first signal strength of the interfering network as measured by the slave device;
determine that the first signal strength exceeds the threshold signal strength;
provide data indicative of the interfering network from the slave device to the master device;
determine, using the master device, a second signal strength of the interfering network as measured by the master device;
configure a detection threshold of the master device to a value less than or equal to the second signal strength to enable the master device to detect transmissions of the interfering network;
determine, using the master device, that the interfering network is not transmitting an interfering signal; and
transmit the audio data from the master device to the slave device.

2. The system of claim 1, further comprising computer-executable instructions to:
determine a physical data rate used by the master device to transmit the signal;
access interference data that associates the physical data rate with a signal-to-noise ratio; and
determine, based on correspondence between the interference data and the physical data rate, a minimum signal-to-noise ratio for signals from the master device received by the slave device that enables the slave device to receive the audio data from the master device;
wherein the threshold signal strength of the interfering network is determined based at least in part on a difference between the minimum signal-to-noise ratio and the signal quality measurement.

3. The system of claim 1, further comprising computer-executable instructions to:
determine that the second signal strength is greater than a minimum detection threshold, wherein the minimum detection threshold is greater than a signal strength of at least one network other than the interfering network; and determine that the second signal strength is less than a maximum detection threshold, wherein the maximum detection threshold is less than a signal strength, measured by the master device, of an access point in communication with the master device;

wherein the detection threshold of the master device is configured in response to the second signal strength being greater than the minimum detection threshold and less than the maximum detection threshold.

4. The system of claim 1, further comprising computer-executable instructions to:

determine, using the master device, a count of networks detectable by the master device at a first detection threshold;

determine that the count of networks is less than a threshold count of networks;

set the first detection threshold as a minimum detection threshold for the master device; and determine that the second signal strength is greater than the minimum detection threshold;

wherein the detection threshold of the master device is configured in response to the second signal strength being greater than the minimum detection threshold.

5. A method comprising:

determining, by a first device, a first signal quality value associated with a network, wherein the first signal quality value indicates a first signal strength of the network as measured by the first device;

determining, by the first device, that the first signal quality value exceeds a threshold signal quality value that prevents the first device from receiving data from a second device;

providing, by the first device, data indicative of the network to the second device;

determining, by the second device, a second signal quality value associated with the network, wherein the second signal quality value indicates a second signal strength of the network as measured by the second device;

configuring a detection threshold of the second device to a level less than or equal to the second signal quality measurement;

determining, by the second device, that the network is not transmitting a first signal; and transmitting data from the second device to the first device.

6. The method of claim 5, further comprising:

determining, by the first device, a third signal quality value associated with a second signal received from the second device; and setting the threshold signal quality value to less than or equal to the third signal quality measurement.

7. The method of claim 5, further comprising:

receiving, by the first device, a second signal from the second device;

determining, by the first device, a data rate associated with transmission of the second signal by the second device;

determining, by the first device, a third signal quality value associated with the second signal;

determining, based on the data rate, a minimum signal-to-noise ratio for data received by the first device from the second device to enable the first device to process data from the second device; and setting the threshold signal quality value based at least in part on the third signal quality measurement and the minimum signal-to-noise ratio.

8. The method of claim 7, wherein the threshold signal quality value is determined based on a difference between the third signal quality measurement and the minimum signal-to-noise ratio.

9. The method of claim 5, further comprising:

determining, using the second device, a third signal quality value associated with receipt of a second signal from an access point; and determining that the second signal quality value is less than or equal to the third signal quality value;

wherein the detection threshold of the second device is configured based on the second signal quality value being less than the third signal quality value.

10. The method of claim 5, further comprising:

determining that the second signal quality value is less than a first minimum detection threshold for the detection threshold of the second device;

determining, using the second device, a count of networks having a signal strength greater than the second signal quality measurement and less than the first minimum detection threshold;

determining the count of networks to be less than a threshold; and decreasing the first minimum detection threshold to a second minimum detection threshold;

wherein the detection threshold of the second device is configured based on the second signal quality measurement being greater than the second minimum detection threshold.

11. The method of claim 5, further comprising:

determining, by the first device, a first utilization value indicative of a frequency of use of the network to transmit signals, wherein the data indicative of the network provided to the second device includes the first utilization value;

determining that the second signal quality measurement is less than a first threshold minimum value for the detection threshold of the second device;

determining a second utilization value indicative of a second frequency of use of at least one additional network detectable by the second device;

determining, that the first utilization value exceeds the second utilization value; and decreasing the first threshold minimum value to a second threshold minimum value;

wherein the detection threshold of the second device is configured based on the second signal quality value being greater than the second threshold minimum value.

12. The method of claim 5, further comprising:

based on the first signal quality value, modifying one or more of:
  inclusion of the first device in a group of audio devices;
  a designation of a master device within the group of audio devices; or
  a data rate used by the second device to transmit data to the first device.

13. A system comprising:

one or more memories storing computer-executable instructions; and one or more hardware processors to execute the computer-executable instructions to:

receive, from a first device, data indicative of an interfering network that prevents receipt of signals by the first device;

determine a signal quality value associated with the interfering network, wherein the signal quality value is indicative of a first signal strength of the interfering network as measured by the system;
configure a detection threshold to a level less than or equal to the signal quality value;
determine that the interfering network is not currently transmitting signals; and
provide data to the first device.

14. The system of claim 13, further comprising computer-executable instructions to:
provide a signal to the first device, wherein one or more of a second signal strength or a data rate is determinable based on the signal.

15. The system of claim 13, further comprising computer-executable instructions to:
determine that the signal quality value is less than a threshold maximum value for the detection threshold and greater than a threshold minimum value for the detection threshold, wherein the threshold maximum value is less than a second signal strength of an access point and the threshold minimum value is greater than a third signal strength of at least one network other than the interfering network.

16. The system of claim 13, further comprising computer-executable instructions to:
determine that the signal quality value is less than a first threshold minimum value for the detection threshold;
determine a count of detectable networks having signal quality values greater than or equal to the signal quality value and less than or equal to the first threshold minimum value;
determine the count of detectable networks to be less than a threshold count of detectable networks; and
based on the count of detectable networks being less than the threshold count, reduce the first threshold minimum value to a second threshold minimum value that is less than or equal to the signal quality value;
wherein the detection threshold is configured based on the signal quality value being greater than or equal to the second threshold minimum value.

17. The system of claim 13, further comprising computer-executable instructions to:
receive, from the first device, a utilization value indicative of a frequency of use of the interfering network to transmit signals;
determine that the signal quality measurement is less than a first threshold minimum value for the detection threshold;
determine that the utilization value exceeds a threshold utilization value; and
based on the utilization value exceeding the threshold utilization value, decreasing the first threshold value to a second threshold value less than or equal to the signal quality value;
wherein the detection threshold is configured based on the signal quality value being greater than or equal to the second threshold value.

18. The system of claim 13, further comprising computer-executable instructions to:
determine that the signal quality value is less than a first minimum threshold value for the detection threshold;
determine a second network having a signal strength value less than the first minimum threshold value and greater than the signal quality value;
determine a utilization value for the second network to be less than a threshold utilization value; and
based on the utilization value being less than the threshold utilization value, reduce the first minimum threshold value to a second minimum threshold value;
wherein the detection threshold is configured based on the signal quality value being greater than or equal to the second minimum threshold value.

19. The system of claim 13, further comprising computer-executable instructions to:
determine a plurality of signal strength measurements associated with the interfering network over a period of time; and
determine a subset of the plurality of signal strength measurements that were determined more recently than each other signal strength measurement of the plurality of signal strength measurements;
wherein the signal quality value is determined based on an average of the subset of the plurality of signal strength measurements.

20. The system of claim 13, further comprising computer-executable instructions to:
determine that the signal quality value is less than a threshold minimum value for the detection threshold; and
provide data indicative of one or more of the interfering network or the first device to an audio group module to cause the audio group module to modify a group of audio devices that includes the first device.

* * * * *